1,577,105

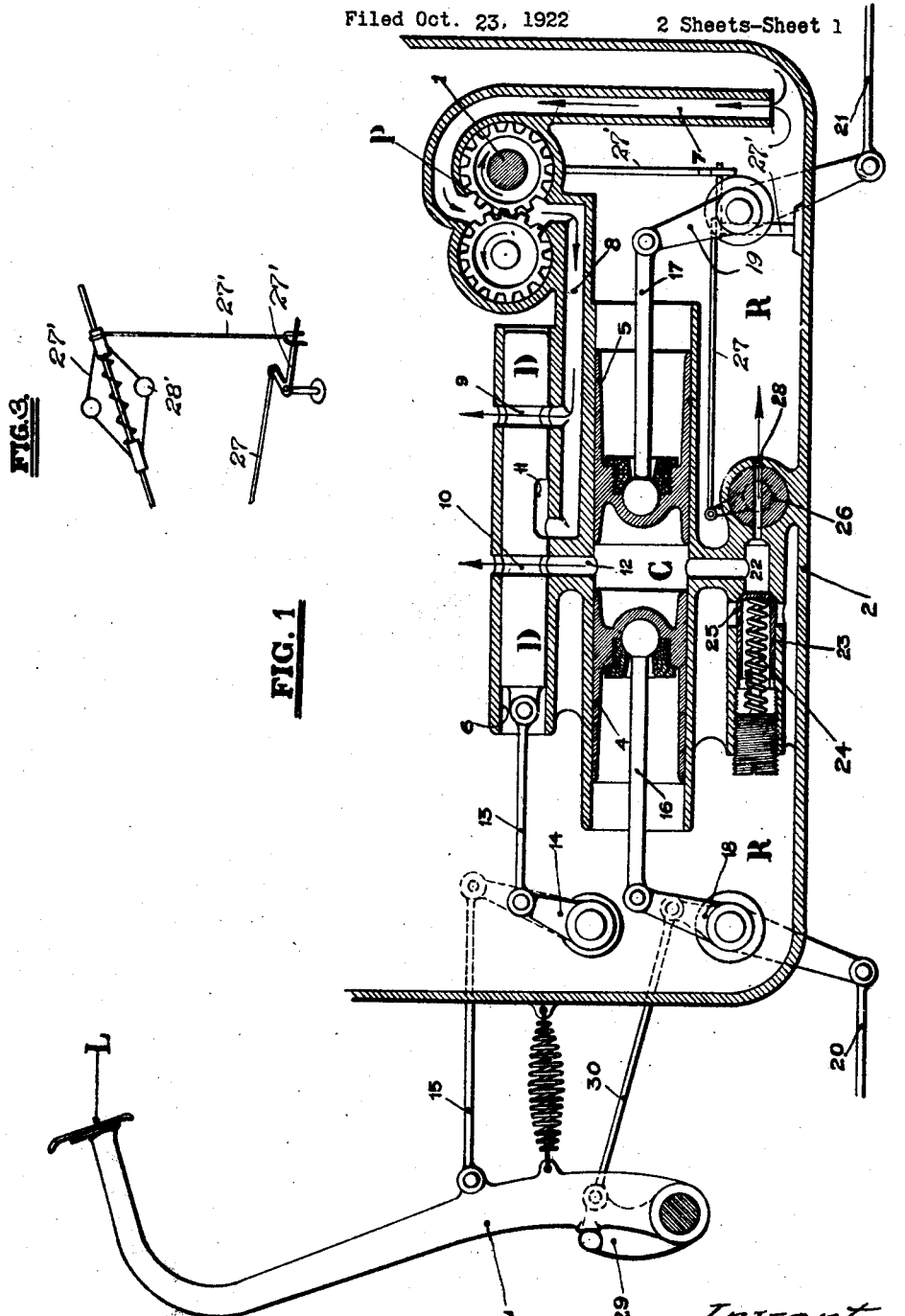

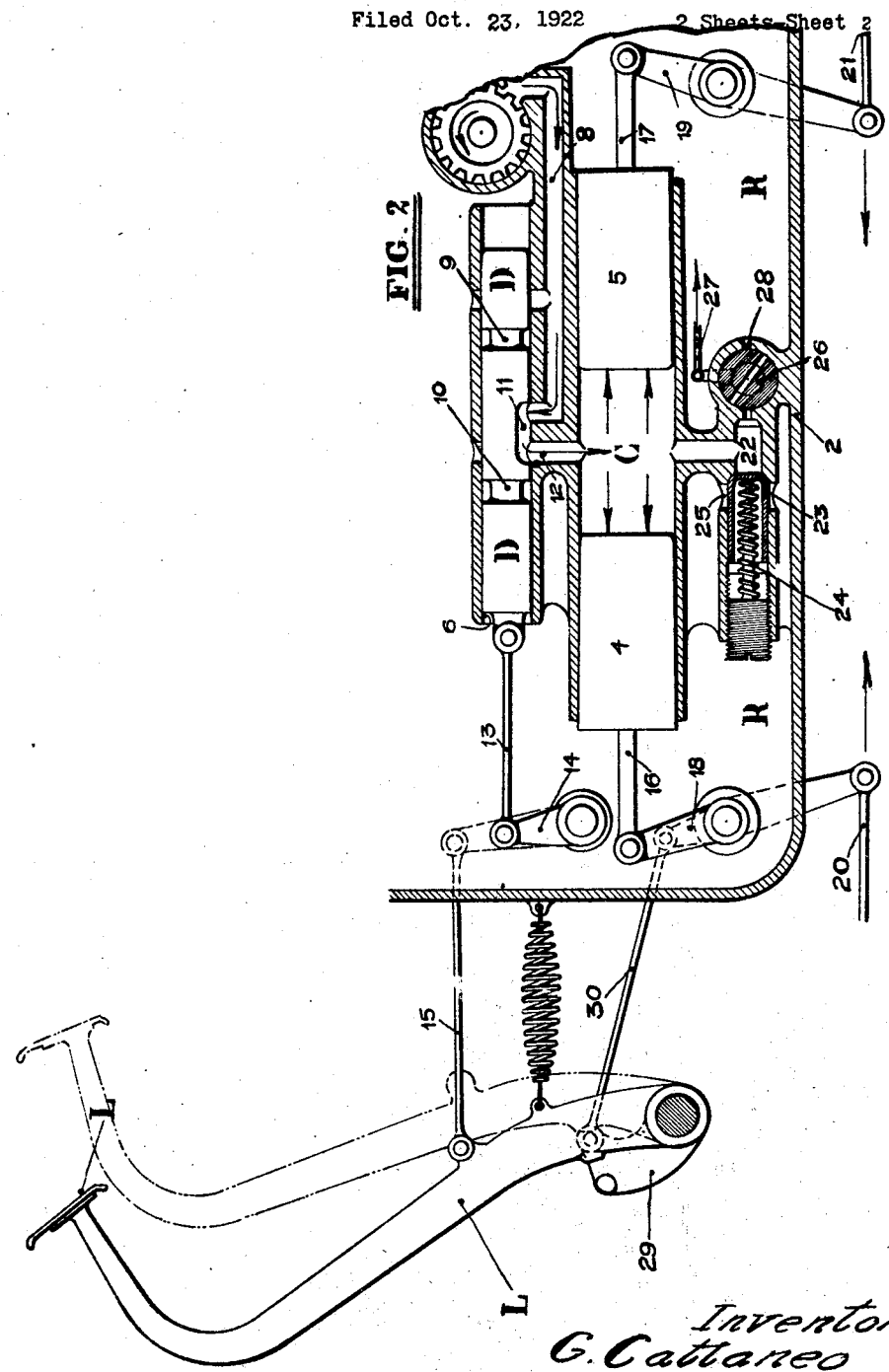
March 16, 1926.
G. CATTANEO
FLUID BRAKE OPERATOR
Filed Oct. 23, 1922
1,577,105
Inventor:
G. Cattaneo Patented Mar. 16, 1926.

UNITED STATES PATENT OFFICE.

GIUSTINO CATTANEO, OF MILAN, ITALY.

FLUID-BRAKE OPERATOR.

Application filed October 23, 1922. Serial No. 596,425.

*To all whom it may concern:*

Be it known that I, GIUSTINO CATTANEO, subject of the King of Italy, residing at Milan, in the Kingdom of Italy, have invented certain new and useful Improvements in a Fluid-Brake Operator, of which the following is a specification.

In modern motor cars, particularly in those of the heavy type the adoption of brakes on the four wheels represents a necessity which has been generally felt, but the simultaneous actuation of two pairs of brakes requires the application of considerable manual pressure on the part of the driver so that notwithstanding the employment of suitable gearing effective results have not been easily obtained.

Another drawback of braking on four wheels at the same time consists in the difficulty in distributing on the front wheels and back wheels a stress which is proportional to the braking effect which can be supplied by the static and dynamic actions acting in various manners on both axles.

Moreover by actuating directly the brakes by means of hand levers or pedal it becomes very hard to adjust the stress which has to be exerted on the brakes in order to obtain the greatest result without skidding of wheels with resultant accidents.

This invention has for its object the applying on any brake actuating system on wheels of motor vehicles a special auxiliary mechanism which:

(1) Takes its movement from the main driving axle and avoids manual operation on the part of the driver;

(2) Can effect the required braking action, as it distributes the latter, in pre-established manner upon the front and the rear pairs of wheels;

(3) Can automatically proportion the braking action to the speed of the vehicle and so obtaining an effective operation of the brakes.

The said device is so arranged that the same actuating part of auxiliary apparatus may also serve to directly actuate the brakes when the said apparatus is damaged or is not provided.

The auxiliary device comprises:

1. A pump of suitable type, driven by the transmission shaft which drives the motor wheels and capable of supplying a determined pressure to the motive fluid which may be the oil contained in the universal joint casing or in the change speed casing or in differential casing or in any other appropriate vessel.

2. Two or four cylinders provided with pistons which under the action of the fluid compressed by the said pump may actuate the levers acting on both brake pairs or on each single brake.

3. A distributing device or valve operated by the device by means of a hand lever or a pedal which may regulate the pressure of fluid on the pistons.

4. A valve inserted in the pressure chamber of cylinders, which automatically opens by means of any centrifugal control device actuated from the shaft transmitting the motion to the wheels and reduces by degrees the pressure of fluid as the rotary movement of wheel tend to stop.

5. A safety valve, which suitably adjusted prevents the pressure of the fluid from exceeding a certain limit.

The invention is clearly illustrated in the accompanying drawings, in which:—

Fig. 1 is a vertical longitudinal sectional view through the improved apparatus the parts being shown in an inactive position, Fig. 2 is a similar view of the part shown in an active or working position, and Fig. 3 is a diagrammatic perspective view of the governor between the drive shaft and the rod of the release valve.

The gearing pump P driven by the shaft 1 which is connected with the transmission to the driving wheels, sucks the fluid through the piping 7 from the bottom of vessel R and forwards it through the cylinder 6 through the opening 9 provided in the distributing piston D and discharges it into the vessel R through an open circuit that is to say without producing any pressure in the piping 8.

When the brakes have to be operated the driver acts on the lever or pedal L which is connected with the crank 14 by means of the rod 15 on the distributing piston rod 13 of distributor piston D. The said piston D is displaced within the cylinder 6 wherein it closes by degrees the communication between the tubes 8 and 9 and also between 10 and 12, while at the same time it puts in communication, by means of the passage 11 therein the tubes 8 and 12 which are in communication with the pressure chamber of cylinder C. While in the said manner by degrees the free passage of the fluid is obstructed, at the same time through 9 a gradual pressure of the fluid flowing against pistons 4 and 5 will be produced and the latter will be displaced and produce also the displacement of cranks and rods 16, 18 and 17, 19 respectively and consequently of two rods 20 and 21 which actuate the braking shoes by suitable mechanical means (not shown).

Even though the gradual stroke of the distributor D may regulate the pressure of fluid according to the braking action which is to be obtained and also taking in account that the output of pump P and thus the pressure of the fluid is proportional within certain limits to the speed of rotation of the pump and consequently to that of the vehicle, some difficulty will be met in preventing the braking stroke which jams the four wheels, attaining at the same time the maximum of braking effect. To accomplish this purpose the device includes a valve 26 which is cock-shaped as shown in the drawings. The said valve is actuated by a suitable regulating centrifugal device 27' by means of the rod 27. The said centrifugal regulating device 27' is driven by the gearing of the motor wheels and consequently it may be keyed on the shaft 1 which drives the pump P. When the speed of the vehicle and accordingly the speed of the wheels becomes prominent the centrifugal masses 28' of the regulator remain extended and the cock or valve 26 remains closed owing to the tensile stress of rod 27 (Fig. 2).

If contrarily the wheels because of an excessive braking tend to stop or slide on the ground, the transmission to the wheels will also slow down in the same manner and thus the centrifugal weights 28' because of their diminished peripheral velocity are retracted and by means of the rod 27 opens the valve 26 (Fig. 1) thus reducing the pressure against the pistons 4 and 5 and consequently the braking effect.

Of course when the vehicle is at standstill the hand control of the brakes is required in order to obtain the braking of wheels. The said control may also be obtained by means of the pedal L which by being oscillated to an extent beyond the angle required to actuate the distributor D moves the lever with tooth 29 and controls by means of rod 30 the crank 18 and consequently the rod 20.

To prevent the pressure of fluid from surpassing the predetermined limits, in the compression chamber 22 a safety valve 23 has been placed which is fastened by a spring 24. When the pressure overcomes the action of spring 24, the valve 23 is displaced and opens the passage 25 thus permitting of the discharge of the excess pressure into the interior of the vessel R.

Having now particularly described and ascertained the nature of my invention and in what manner the same is to be performed, I declare that what I claim is:—

1. In a fluid brake operator of the character described, the combination, a motor driven shaft, an oil containing vessel through which the shaft passes, a casing surrounding the driven shaft within the vessel, a pump connected with the shaft within the casing, an inlet tube in communication with the casing from a point near the bottom of the vessel, a slide valve the casing of which is arranged in communication with the pump casing, a double cylinder communicating medially of its ends with the casing of the slide valve, opposed pistons operating in the cylinder, brake shoe applying members operably connected with the pistons, a manually operable lever operatively connected with the slide valve for regulating the introduction of pressure liquid into the cylinder, an operable connection between the lever and one of the pistons for effecting manual control of the brake shoe applying members when the drive shaft is idle, and means for controlling the release of pressure liquid from the cylinders.

2. A fluid brake operator as claimed in claim 1, wherein the means for controlling the passage of pressure liquid from the cylinder includes a valve composed of a casing, an apertured body therein for regulating the escape of a liquid from the cylinder through the casing and into the vessel, a governor mounted on the motor driven shaft and an operable connection between the governor and the valve body for regulating the position of the valve body consistent with the speed of rotation of the motor driven shaft, substantially as and for the purposes set forth.

3. A fluid brake operator as claimed in claim 1, wherein a spring controlled safety valve is interposed in the outlet from the cylinder for permitting of the discharge of excessive pressure into the interior of the vessel, substantially as and for the purposes set forth.

4. A fluid brake operator of the character described, comprising in combination a motor driven shaft, a pressure fluid containing vessel through which the shaft is journalled, a pump operably connected with the shaft including a casing surrounding the shaft, an inlet tube communicating with the casing and terminating at a point near the bottom of the vessel, a slide valve the casing of which is arranged in communication with the casing of the pump, a cylinder arranged in communication with the casing of the slide valve, opposed pistons operably mounted in the cylinder including heads and rods, brake shoe applying members, means within the vessel and operably connected between the brake shoe applying members and the rods of the pistons, a manually operable lever operably connected with the slide valve for controlling the action of the pressure fluid on the pistons, an outlet leading from the cylinder, a spring pressed safety valve interposed in the outlet for releasing excessive pressure, valve means for controlling the discharge of pressure liquid from the cylinder into the vessel including a casing in communication with the outlet, an apertured valve body for controlling the flow from the outlet through the casing and into the vessel, a governor operably mounted on the motor driven shaft, an operable connection between the governor and the valve body for regulating the position of the valve body consistent with the speed of rotation of the shaft, and an operable connection between one of the piston rods and the manually operable lever for effecting a manual control of the brake shoe applying member when the driven shaft is inactive, substantially as and for the purposes set forth.

Signed at Milan, Italy, this 3rd day of October, 1922.

GIUSTINO CATTANEO.